(No Model.)

W. B. McMASTER.
NUT LOCK WASHER.

No. 523,001. Patented July 17, 1894.

Witnesses.
J. V. Wood.
L. C. Barabini.

Inventor
William B. McMaster
By H. B. Hagin atty

UNITED STATES PATENT OFFICE.

WILLIAM BROOKS McMASTER, OF LEAVENWORTH, KANSAS.

NUT-LOCK WASHER.

SPECIFICATION forming part of Letters Patent No. 523,001, dated July 17, 1894.

Application filed February 23, 1894. Serial No. 501,248. (No model.)

*To all whom it may concern:*

Be it known that I, WILLIAM BROOKS MCMASTER, a citizen of the United States of America, residing at Leavenworth, in the county of Leavenworth and State of Kansas, have invented certain new and useful Improvements in Nut-Lock Washers, of which the following is a specification, reference being had therein to the accompanying drawings, and the letters of reference thereon, forming a part of this specification, in which—

Figure 1:
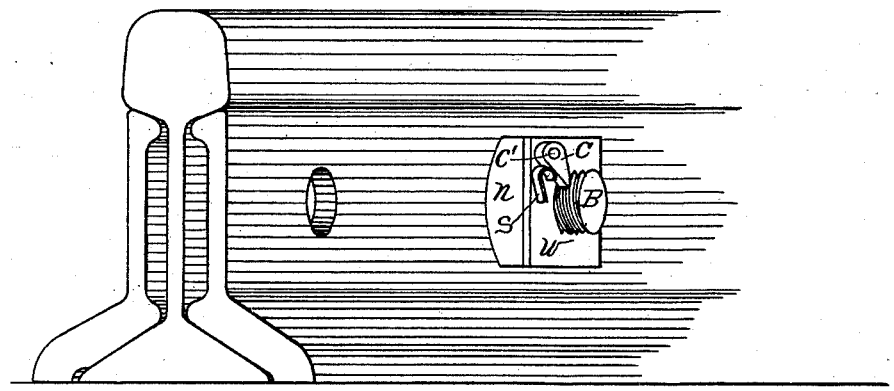
Figure 2:
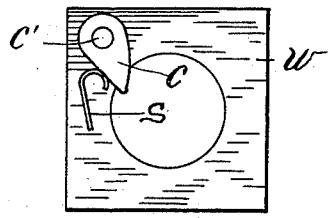
Figure 3:
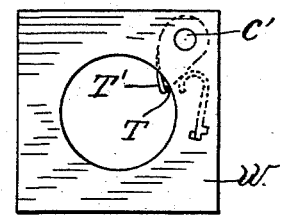
Figure 4:
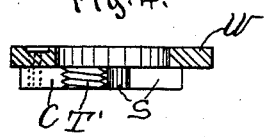
Figure 5:
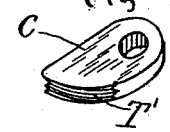
Figure 6:
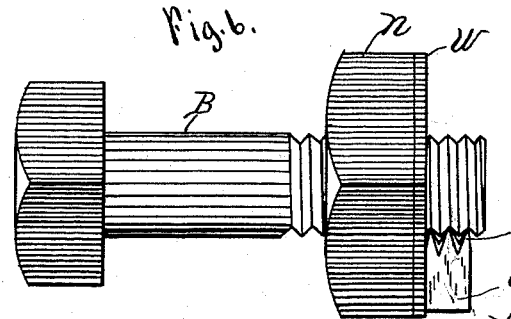

Figure 1. is a perspective view of a railroad rail with my improved nut lock washer attached thereto. Fig. 2. is a top plan of the nut lock washer. Fig. 3. is a bottom plan of the same. Fig. 4. is a cross sectional view of the washer showing the cam shaped lug and spring attached thereto. Fig. 5. is a perspective view of the lug showing the threads on one side. Fig. 6. is a side view of a bolt and nut, with my improved nut lock washer attached thereto.

This invention relates to certain improvements in nut lock washers wherein a threaded cam shaped lug is rotatably secured to the washer, and held against the side of the bolt by means of a spring, and consists of a washer with a lug and spring attached thereto.

Referring to the drawings N represents a nut.

B represents a threaded bolt, and W represents a washer, to which is secured the cam shaped lug, C, by means of the rivet or bolt C', and the spring S.

T and T' represent the threaded end of the cam shaped lug. Said lug is secured to the washer by means of a bolt or rivet passing through a hole in one end of the lug and through a corresponding hole in the washer which is countersunk on the under side, so the washer can lie snug against the nut N, without interfering with the rivet or nut rotating in the washer, thus allowing the lug to rotate. The spring S is secured to the washer at one end, the other end yieldingly but firmly pressing against the lug C, which is thus held at the threaded end against the threaded portion of the bolt. The threads in the lug are of a sharper angle than those in the bolt (see Fig. 6) and as the lug is made of chilled steel the threads will cut into the threads of the bolt. The lug is so arranged that the longest side of the lug is next to the spring. Any tendency to loosen would tend to turn the washer from right to left, when the lug would tend to dig into the bolt, and thus prevent either the nut or bolt from turning or becoming loose. The thread nearest the washer on the lug as shown at T, (see Fig. 3,) is of slightly less diameter than the threads T', so that it will more readily catch the threads on the bolt.

In use the nut is turned snug on the bolt against the object to be held, then the washer is turned snug against the nut, the washer thus prevents the nut from turning off, and the lug C prevents either the washer or the bolt from turning.

Having thus described my invention, what I claim as new and useful, and desire to secure by Letters Patent, is as follows:

1. In a nut lock washer the combination with the bolt, and nut having a spring actuated cam shaped lug, having threads T', and T, the thread T being of less diameter than the threads T', so the threads on the lug will more readily catch on the threads of the bolt, substantially as shown and described.

2. In a nut lock washer, the combination with the bolt, and nut, of a washer, provided with a threaded cam shaped lug, the thread T, being of less diameter than the balance of the threads T', said lug pivotally connected to the washer, and a spring, one end of which is secured to the washer, and the other end pressing the loose end of the lug against the threaded portion of the nut, substantially as shown and described.

WILLIAM BROOKS McMASTER.

Witnesses:
CYRUS FANNING,
CYRUS L. DANFORTH.